W. C. HANSEN.
BAKE PAN.
APPLICATION FILED JUNE 20, 1921.

1,396,684.

Patented Nov. 8, 1921.

W. C. Hansen, Inventor

By C. A. Snow & Co.
Attorney

UNITED STATES PATENT OFFICE.

WILLIAM C. HANSEN, OF ROCK ISLAND, ILLINOIS.

BAKE-PAN.

1,396,684. Specification of Letters Patent. Patented Nov. 8, 1921.

Application filed June 20, 1921. Serial No. 479,059.

*To all whom it may concern:*

Be it known that I, WILLIAM C. HANSEN, a citizen of the United States, residing at Rock Island, in the county of Rock Island and State of Illinois, have invented a new and useful Bake-Pan, of which the following is a specification.

This invention relates to baking pans and more particularly to pans employed in baking biscuits, cookies or the like.

The primary object of the invention is to provide an exceptionally strong and durable pan constructed of sheet metal, capable of being formed by a stamping or pressing machine.

A further object of the invention is to provide a pan wherein the corners thereof are cut away to permit the articles being baked to be removed with facility, due consideration being had for the strengthening of the side walls of the pan.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1:
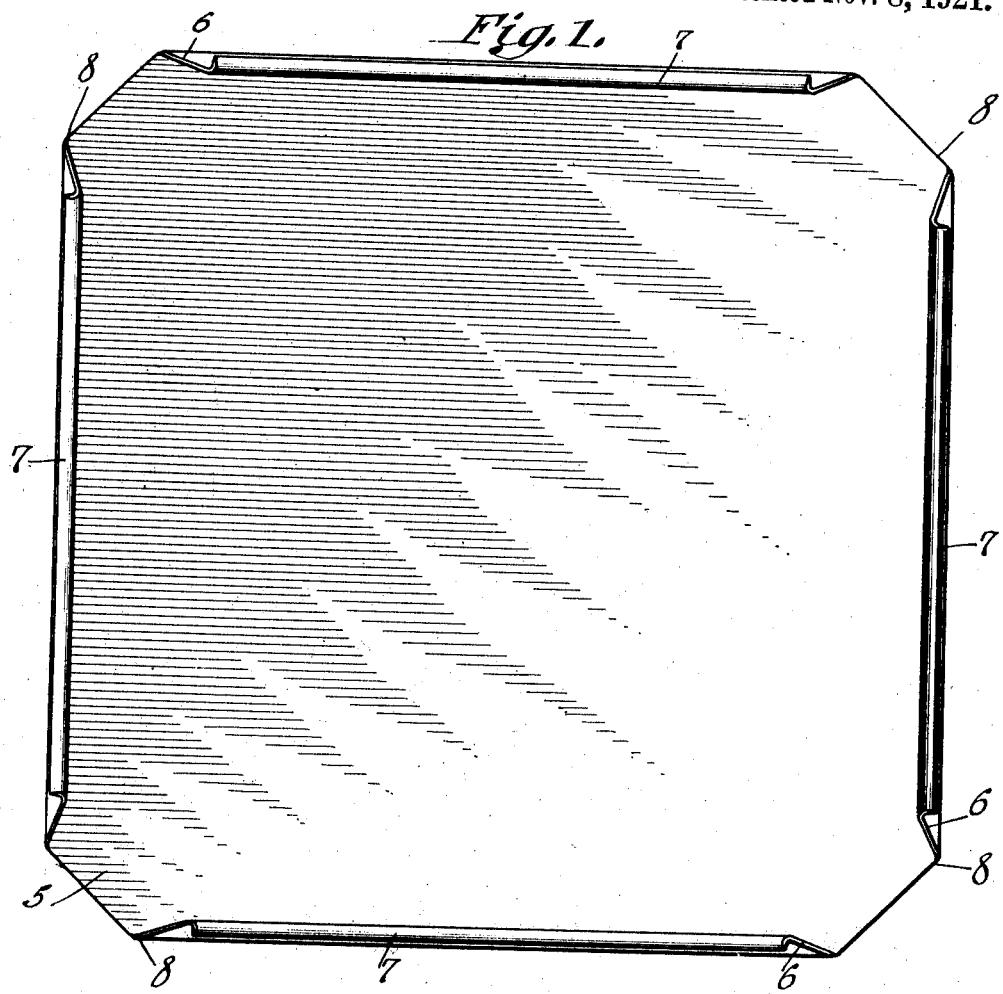
Figure 1 is a plan view of a pan constructed in accordance with the present invention.
Figure 2:
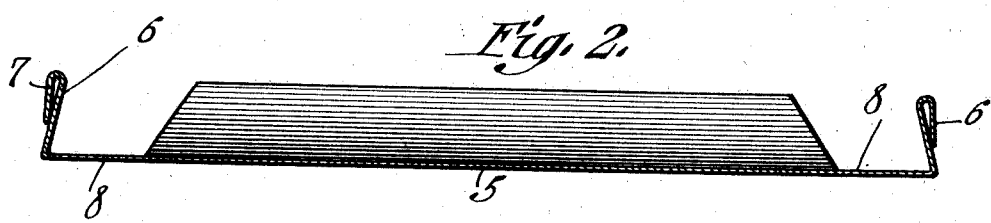
Fig. 2 is a sectional view through the pan.

Referring to the drawing in detail, the pan is formed of sheet metal and includes a body portion 5 which has portions thereof formed at approximately right angles to provide the side walls 6 of the pan.

In order that the side walls of the pan may be strengthened, portions thereof are turned downwardly as at 7 to overlie portions of the side wall and prevent bending thereof.

As shown the corners of the pan are cut away as at 8 to permit a knife or similar device to be inserted under the articles being baked within the pan to easily remove the same.

From the foregoing it will be seen that I have provided a pan which may be stamped from a strip of sheet metal, the upper edges of the side walls being turned downwardly, which construction may be accomplished by a single operation of a stamping or pressing machine.

Having thus described the invention, what is claimed as new is:—

1. A baking pan comprising a body portion having side walls formed integral therewith, means forming a part of the side walls for reinforcing the same, and said pan having its corners cut away.

2. A baking pan comprising a body portion having side walls, portions of the side walls being turned downwardly to reinforce the same, and said pan having its corners cut away to provide openings.

In testimony that I claim the foregoing as my own, I have hereto affixed my signature in the presence of two witnesses.

WILLIAM C. HANSEN.

Witnesses:
 WM. EIFFERT,
 CONRAD EIFFERT.